United States Patent
Ueda

[11] Patent Number: 5,450,849
[45] Date of Patent: Sep. 19, 1995

[54] LOCATION APPARATUS

[75] Inventor: Tomoaki Ueda, Kyota, Japan

[73] Assignee: Daikin Industries, Ltd., Osaka, Japan

[21] Appl. No.: 193,164

[22] PCT Filed: Aug. 12, 1992

[86] PCT No.: PCT/JP92/01036

§ 371 Date: Feb. 10, 1994

§ 102(e) Date: Feb. 10, 1994

[87] PCT Pub. No.: WO93/03674

PCT Pub. Date: Mar. 4, 1993

[30] Foreign Application Priority Data

Aug. 13, 1991 [JP] Japan ................... 3-203056

[51] Int. Cl.$^6$ .............................................. A61B 8/00
[52] U.S. Cl. .................................. 128/660.07; 73/602
[58] Field of Search ................... 128/660.01, 660.07,
128/661.08, 661.09, 661.10; 73/602, 861.25;
364/413.13, 413.18, 413.21, 413.25

[56] References Cited

U.S. PATENT DOCUMENTS

| Re. 33,816 | 2/1992 | Nagasaki et al. | 128/660.07 |
|---|---|---|---|
| 4,512,195 | 4/1985 | Miwa et al. | |
| 4,757,715 | 7/1988 | Miwa et al. | |
| 4,848,354 | 7/1989 | Angelsen et al. | 128/661.09 |

FOREIGN PATENT DOCUMENTS

| 59-19852 | 2/1984 | Japan . |
|---|---|---|
| 60-127457 | 7/1985 | Japan . |
| 62-192146 | 8/1987 | Japan . |

Primary Examiner—George Manuel
Attorney, Agent, or Firm—Beveridge, DeGrandi, Weilacher & Young

[57] ABSTRACT

A difference between a received wave and a convolution operation result is calculated by a difference calculating section, the convolution operation result being obtained by carrying out a convolution operation based upon operation results output from impulse response operating sections $(1_0)(1_1) \ldots (1_n)$ which employ a peak value of each pulse as a multiplier and employ an estimated value of an unknown impulse response as a multiplicand, each pulse being obtained by obtaining a pulse train based upon a radiating waveform. The estimated impulse responses are corrected by correcting sections $(1_{0a})(1_{1a}) \ldots (1_{na})$ of the impulse response operating sections $(1_0)(1_1) \ldots (1_n)$ based upon the calculated difference. And the corrected estimated impulse responses are supplied to the impulse response operating section at the next stage. Location with high discrimination and with real time processing, and enlargement in locating extent with keeping high discrimination are performed by carrying out these processings.

2 Claims, 4 Drawing Sheets

LOCATION APPARATUS

SPECIFICATION

1. Technical Field

The present invention relates to a location apparatus. More particularly, the present invention relates to a location apparatus depending upon a principal which is coincident to a principal of a pulse echo method, the location apparatus being represented by sonic location using an ultrasonic wave.

2. Background Art

From the past years, a so called pulse echo method is widely known, which method measures a location on a boundary face at which a density of the medium varies, based upon an intensity of pulse echoes, by periodically radiating an ultrasonic pulse from a wave radiating point 91 and by receiving pulse echoes at wave receiving points 93, the pulse echo being reflected by a reflector 92 and coming back, as is illustrated in FIG. 3.

In recent years, an ultrasonic tomograph, among other non-invasion measuring devices for medical use, has been extremely spread and has greatly contributed to improvement in accuracy of diagnosis. An operation principal of an ultrasonic diagnosing apparatus which is represented by an ultrasonic tomograph, is the same as a pulse echo method which is widely known as a principal of active sonar. Wherein, a mode for observing a time waveform of intensity of a reflected wave, is called an A-mode (refer to FIG. 4), a mode for observing a two dimensional image which is in a depth direction and in a scanning direction by scanning a probe one dimensionally and by determining a threshold value, is called a B-mode (refer to FIG. 5), and a mode for observing a two dimensional image, each point of the image being at an equal depth one another, by performing the scanning two dimensionally, is called a C-mode (refer to FIG. 6).

Therefore, diagnosis of the interior of a human body can be performed without injuring the human body, by employing the ultrasonic diagnosing apparatus and by selecting the A-mode, B-mode or C-mode corresponding to the species of the objected diagnosis.

By employing an ultrasonic flaw detecting apparatus based upon the similar principal as of the foregoing, various structures can be checked to determine whether or not cracks exist in the interior thereof and the like. The abovementioned ultrasonic diagnosing apparatus has a spacial discrimination of about 5 mm, which is too low in comparison with a spacial discrimination (about 1 mm) required for usage of early detection of cancer and the like, therefore a disadvantage arises in that the abovementioned ultrasonic diagnosing apparatus cannot be applied to usage of early detection of cancer and the like.

It is thought that a length of a burst wave of a radiating ultrasonic wave is shortened for the purpose of improving spacial discrimination (improving resolution). Specifically, it is generally selected to accomplish this by shortening a burst wave by selecting a high frequency as a frequency of a radiating ultrasonic pulse, because a burst waveform can easily be shortened by raising a frequency of an ultrasound. But, when the frequency is raised, attenuation of a ultrasound becomes remarkable, and a new disadvantage arises in that an ultrasound having a high frequency cannot be applied to diagnosing a deep portion of a human body. It is thought that a probe which can output a short burst waveform can be employed for shortening the burst waveform without raising a frequency. But, development of a new probe requires research of material by trial and error, and a disadvantage arises in that the development requires a long time period. Thereby, a new probe cannot be applied immediately in the present condition.

Further, it is known as a method for improving spacial discrimination without raising a frequency of an ultrasonic pulse, that an impulse response is obtained by performing fast Fourier transformation operation (hereinafter referred to as FFT operation) based upon a radiating waveform and received waveform. But, disadvantages arise in that a limitation exists which requires a sampling number of data by $2^N$, in that operating apparatus becomes large in size, and in that real time obtaining is eliminated. Therefore, the FFT is scarcely used for diagnosis of a human body which makes much account of real time obtaining.

In the foregoing, only a searching method of an ultrasonic diagnosis apparatus is described, similar disadvantages as the above-mentioned disadvantages arise in an ultrasonic flaw detecting apparatus, a radar and the like.

The present invention was made to solve the above-mentioned problems.

It is an object of the present invention to supply a novel location apparatus which can improve spacial discrimination without varying a radiating wave, and which can perform real time location.

Disclosure of The Invention

To perform the object above-mentioned, a location apparatus according to claim 1 of the present invention includes;

pulse train recording means for recording a radiating wave as plural pulse trains, impulse response operating means for performing operations based upon corresponding impulse responses which are assigned to each pulse and a predetermined value, and for influencing the corresponding impulse response of the operation corresponding to a next pulse, convolution operating means for the operation results, the convolution operating means performing convolution operations of operation results obtained by each impulse response operating means, difference calculating means for calculating a difference between the convolution operation result and a received wave, and correcting means for correcting the impulse response in each impulse response operating means based upon a calculated difference.

The impulse response operating means may include the pulse train recording means and the correcting means therein.

As to the location apparatus according to claim 1, the radiating wave is recorded by the pulse train recording means as plural pulse trains, and the operations are performed by the impulse response operating means based upon corresponding impulse responses which are assigned to each pulse and a predetermined value. The operation corresponding to a next pulse is influenced by the operation result from the impulse response operating means, when a location on a boundary face at which a density of a medium varies based upon a received wave which is obtained by radiating a radiating wave and by receiving a reflected wave. And, the operation result obtained by each impulse response operating means is convolution operated by the convolution operating means for operation results, the difference between the convolution operation result and the received wave is calculated by the difference calculating means, the impulse response in each impulse response operating means being corrected based upon the calculated difference by the correcting means. Accordingly, high spacial descrimination can be performed without using a special wave radiating device and wave receiving device. Enlargement of locating extent and raising of spacial descrimination can be performed by lowering the pulse frequency of the radiating wave and by raising a sampling rate of the received wave, even when the material being examined has a great attenuating rate in a high frequency band. Further, the impulse response can be obtained in real time which is different from the FFT processing.

A location apparatus according to claim 2 of the present invention further includes;

preceding received wave pulse outputting means for outputting a received wave pulse which precedes a current received wave pulse, convolution operating means for operation results which correspond to a preceding received wave, difference calculating means which correspond to a preceding received wave, and convolution operating means for convolution operating a difference obtained by the corresponding difference calculating means, and for supplying a convolution operation result to the correcting means in correspondence to each impulse response operating means.

As to the location apparatus according to claim 2 of the present invention, resistance to noises is raised, therefore the location on the boundary face at which a density of the medium varies, can be measured with high accuracy, because the impulse response is corrected by taking not only the received wave at the present time but also the preceding received wave into consideration.

DETAILED DESCRIPTION OF PREFERRED EMBODIMENTS

Hereinafter, referring to the attached drawings, we explain the present invention in detail.

Figure 1:
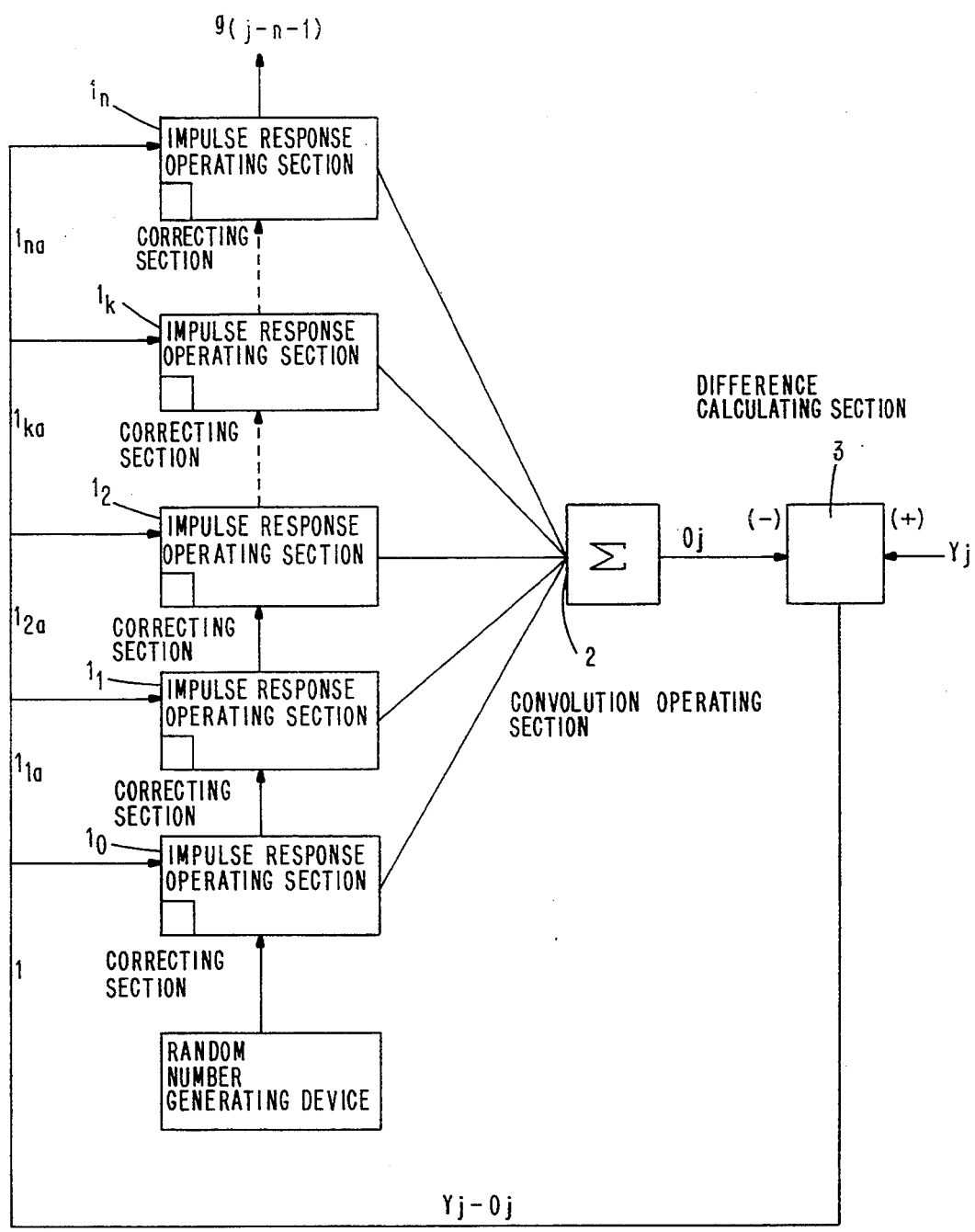
FIG. 1 is a block diagram illustrating a main portion of an acoustic location apparatus as an embodiment of a location apparatus according to the present invention.

FIG. 1 is a block diagram illustrating a main portion of an ultrasonic location apparatus as an embodiment of a location apparatus according to the present invention.

The ultrasonic location apparatus includes;

impulse response operating sections $1_0, 1_1, \ldots, 1_n$ for performing operations in which a peak value $x_0, x_1, \ldots x_n$ of each pulse, when an ultrasonic wave which is radiated from a wave radiating device and has a predetermined frequency, is determined as a multiplier, and an impulse response $g_j, g_{(j-1)}, \ldots, g_{(j-n)}$ to be estimated is determined as a multiplicand, a convolution operating section 2 for performing convolution operations based upon the operation results output from all impulse response operating sections, a difference calculating section 3 for receiving the convolution operation result and the received wave pulse obtained by sampling a waveform of a received wave at a predetermined sampling Fate, and for calculating a difference between the both, and a random number generating device 4 for giving a virtual initial value for an unknown impulse response $g_j$ to the impulse response operating section $1_0$ at the first stage.

The impulse response operating sections $1_0, 1_1, \ldots, 1_n$ have correcting sections $1_{0a}, 1_{1a}, \ldots, 1_{na}$ for correcting corresponding impulse responses based upon the above-mentioned difference, and each impulse response operating section supplies the impulse response corrected by each correcting section to the impulse response operating section of the next stage. The impulse response corrected by the correcting section $1_{na}$ of the last stage is output as an ultrasonic locating result.

More specifically, when an impulse response of a boundary face at time 3 is expressed by $G_j$, a measured reflected wave (received wave) is expressed by $Y_j$, and a sound pressure of the radiated ultrasonic pulse is small and satisfy linear addition, the received wave $y_j$ can be expressed by the following equation, because a peak value $x(\tau)$ of each pulse of the radiating ultrasonic wave is $x_0, x_1, \ldots, x_n$.

$$y_j = \sum_{i=0}^{n} G_{(j-i)} \cdot x_i$$

Therefore, when an accurate impulse response is determined in each impulse response operating section, the convolution operation result $O_j$ (refer to the next equation) coincides with the received wave $y_j$, and the difference $y_j - O_j$ output from the difference calculating section 3 for operation result, becomes 0.

$$O_j = \sum_{i=0}^{n} g_{(j-i)} \cdot x_i$$

But, a case scarcely exists in which accurate impulse responses are determined for all impulse response operating sections actually, and noises are mixed when measuring is performed. Therefore, the difference $y_j - O_j$ corresponding to a shift between the estimated impulse response $g_{(j-i)}$ and the actual impulse response $G_{(j-i)}$, is output from the difference calculating section 3 for operation result.

Then, the estimated impulse response is corrected by performing the correcting operation, which is indicated by the following equation, based upon the difference $y_j - O_j$ output from the difference calculating section 3 for operation result, in the correcting section which is included in each impulse response operating section.

$$g_{(j-i)} = g_{(j-i)} + \epsilon \cdot (y_j - O_j) \cdot x_i$$

Wherein, $\epsilon$ is a parameter which influences a convergence speed and stability of an impulse response, and is determined by an extremely small positive value.

Therefore, the estimated impulse response comes nearer to the actual impulse response $G_{(j-i)}$ by a correction value based upon the above-mentioned correcting operation. The corrected impulse response is supplied to the impulse response operating section of the next stage so as to correspond to the processing at the next time, then a processing similar to the above-mentioned processing is repetitively performed.

As a result, the impulse response $g_{(j-i)}$ which can be approximated with high accuracy to the actual impulse response $G_{(j-i)}$, is obtained by sequentially performing the above-mentioned processings in the impulse response operating sections $1_0, 1_1, \ldots, 1_n$.

As is apparent from the foregoing, after the impulse response correcting processings of n-number of stages are performed, the impulse response can instantaneously be obtained at every obtaining of data, thereby real time processing can be realized. The location apparatus can easily be raised in resolution by lowering the frequency of the radiating wave so as to decrease attenuating thereof and by raising the sampling rate for obtaining a data train.

Second Embodiment

Figure 2:
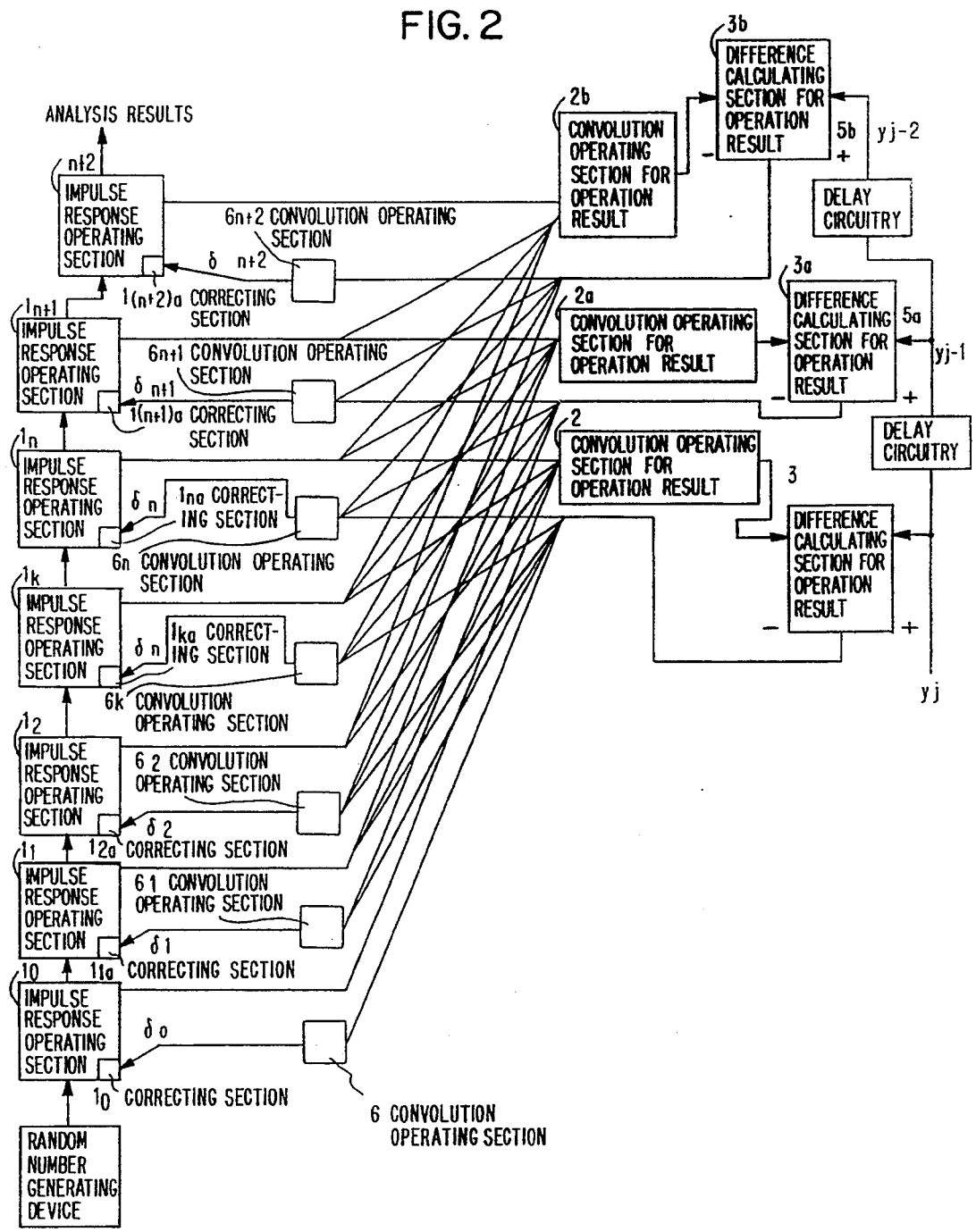
FIG. 2 is a block diagram illustrating a main portion of an acoustic location apparatus as another embodiment of a location apparatus according to the present invention.
Figure 3:
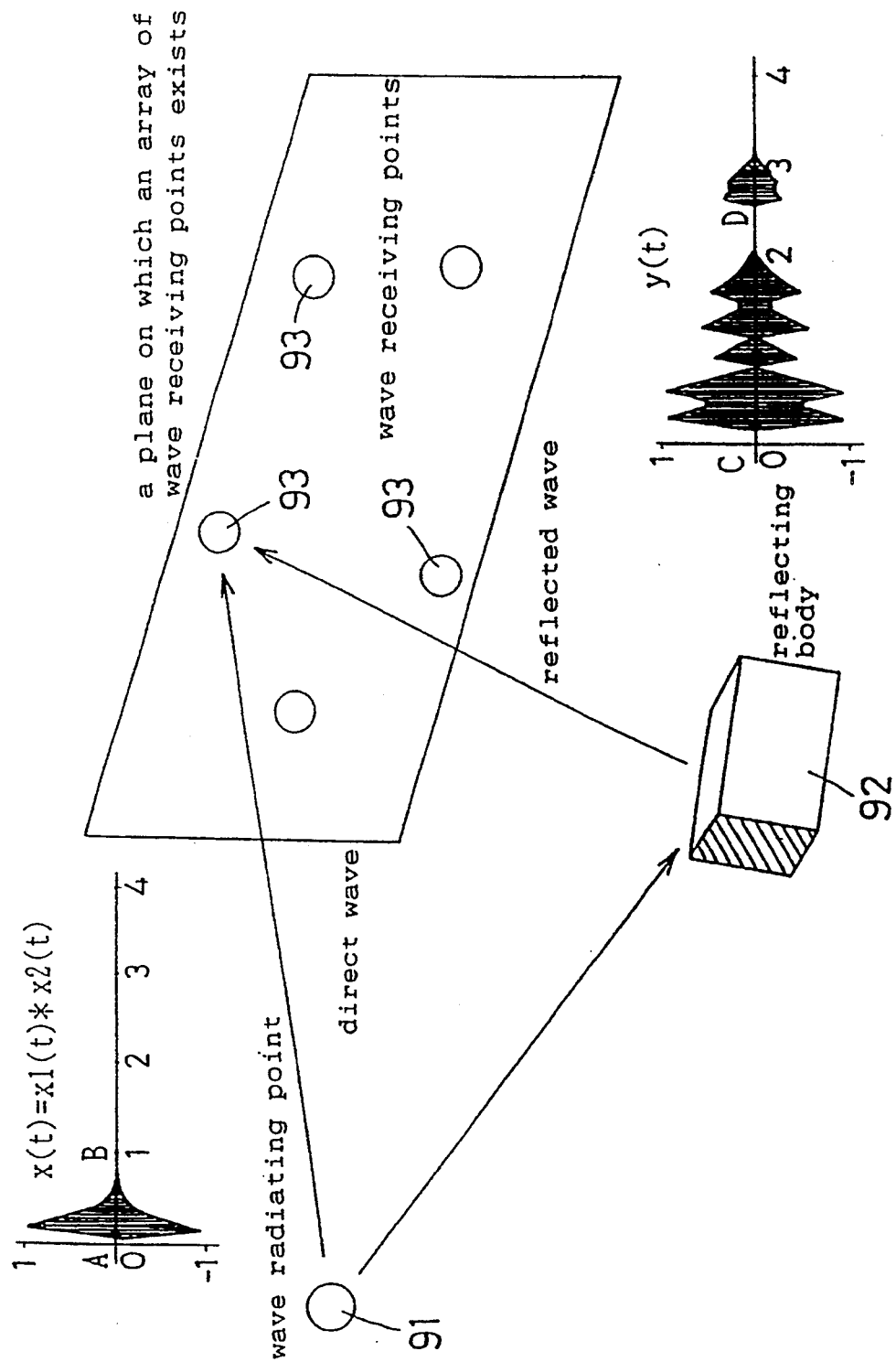
FIG. 3 is a schematic diagram for explaining a principal of a pulse echo method.
Figure 4:
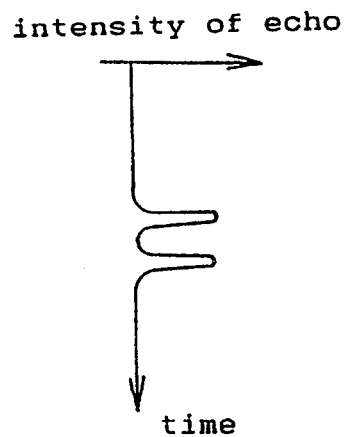
FIG. 4 is a schematic diagram for explaining a mode for observing a time waveform of intensity of a reflected wave.
Figure 5:
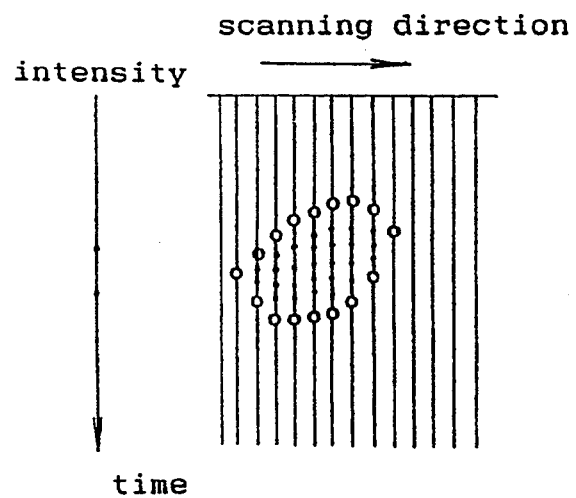
FIG. 5 is a schematic diagram for explaining a mode for observing a two dimensional image which is in a depth direction and in a scanning direction by scanning a probe one dimensionally and by determining a threshold value.
Figure 6:
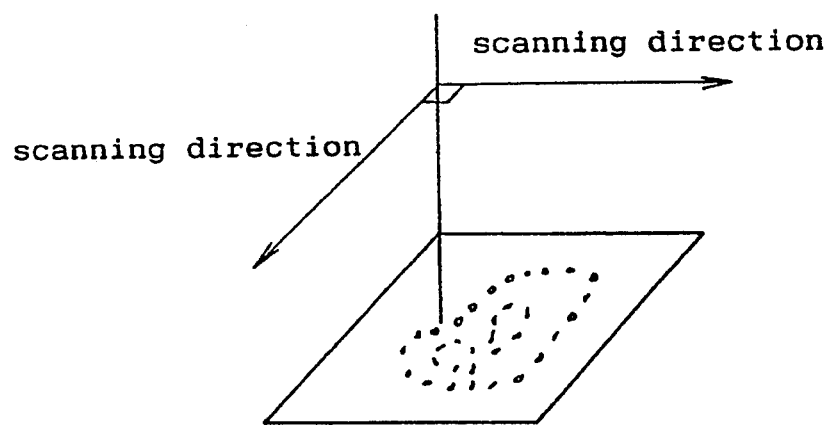
FIG. 6 is a schematic diagram for explaining a mode for observing a two dimensional image, each point of the image being at an equal depth one another, by performing the scanning two dimensionally.

FIG. 2 is a block diagram illustrating a main portion of an acoustic location apparatus as another embodiment of a location apparatus according to the present invention.

The acoustic location apparatus differs from the embodiment of FIG. 1 in that convolution operating sections 2a, 2b and difference calculating sections 3a, 3b for operation results are further provided other than the convolution operating section 2 and the difference calculating section 3 for operation result, in that delay circuitries 5a, 5b are provided for supplying the received wave to the difference calculating sections 3a, 3b for operation result under the condition that the received wave are delayed by a predetermined time period, in that impulse response operating sections $1_{n+1}$, $1_{n+2}$ are further provided and in that convolution operating sections $6_0, 6_1, \ldots, 6_n, 6_{n+1}, 6_{n+2}$ are provided corresponding to each impulse response operating section, so as to supply the operation result output from the convolution operating section to the correcting section included in the corresponding impulse response operating section.

And, the operation results output from the impulse response operating sections $1_0, 1_1, \ldots, 1_n$ are supplied to the convolution operating section 2, the operation results output from the impulse response operating sections $1_1, 1_2, \ldots, 1_n, 1_{n+1}$ are supplied to the convolution operating section 2a for operation result, and the operation results output from the impulse response operating sections $1_2, 1_3, \ldots, 1_n, 1_{n+1}, 1_{n+2}$ are supplied to the convolution operating section 2a for operation result. And, the difference output from the difference calculating section 3 for operation result is supplied to the convolution operating sections $6_0, 6_1, \ldots, 6_n$ for difference, the difference output from the difference calculating section 3a for operation result is supplied to the convolution operating sections $6_1, 6_2, \ldots, 6_n, 6_{n+1}$ for difference, and the difference output from the difference calculating section 3b for operation result is supplied to the convolution operating sections $6_2, 6_3, \ldots, 6_n, 6_{n+1}, 6_{n+2}$ for difference.

Thetrefore, in this embodiment, a difference is calculated by each convolution operating section for operation result and difference calculating section as similar as of the first embodiment. As a result, the difference $d_j = y_j - O_j$ at time j, the difference $d_{j-1} = y_{j-1} - O_{j-1}$ at time $j-1$, and the difference $d_{j-2} = y_{j-2} - O_{j-2}$ at time $j-2$ are obtained simultaneously. These differences are supplied to corresponding convolution operating section for difference, respectively, and the operation results output from the convolution operating sections for difference are supplied to the correcting section of the corresponding impulse response operating section, respectively. Wherein, the convolution operating section $6_i$ (i=2, 3, ..., n) is determined weighting factors $x_i$, $x_{i+1}$, $x_{i+2}$ corresponding to the differences $d_j, d_{j-1}, d_{j-2}$ output from the difference calculating sections 3, 3a, 3b. The convolution operating section $6_i$ performs a convolution operation of $x_i \cdot d_j + x_{i+1} \cdot d_{j-1} + x_{i+2} \cdot d_{j-2}$ so as to obtain an operation result, and supplies the operation result to the correcting section of the corresponding impulse response operating section. The convolution operating section $6_0$ determines a weighting factor $x_0$ corresponding to the difference $d_j$ output from the difference calculating sections 3. The convolution operating section $6_0$ performs a convolution operation of $x_0 \cdot d_j$ so as to obtain an operation result, and supplies the operation result to the correcting section of the corresponding impulse response operating section. The convolution operating section $6_1$ determines weighting factors $x_0, x_1$ corresponding to the differences $d_j, d_{j-1}$ output from the difference calculating sections 3, 3a. The convolution operating section $6_1$ performs a convolution operation of $x_0 \cdot d_j + x_1 \cdot d_{j-1}$ so as to obtain an operation result, and supplies the operation result to the correcting section of the corresponding impulse response operating section. The convolution operating section $6_{n+1}$ determines weighting factors $x_{n-1}, x_n$ corresponding to the differences $d_{j-1}, d_{j-2}$ output from the difference calculating sections 3a, 3b. The convolution operating section $6_{n+1}$ performs a convolution operation of $x_n \cdot d_{j-1} + x_{n-1} \cdot d_{j-2}$ so as to obtain an operation result, and supplies the operation result to the correcting section of the corresponding impulse response operating section. The convolution operating section $6_{n+2}$ determines a weighting factor $x_n$ corresponding to the difference $d_{j-2}$ output from the difference calculating sections 3b. The convolution operating section $6_{n+2}$ performs a convolution operation of $x_n \cdot d_{j-2}$ so as to obtain an operation result, and supplies the operation result to the correcting section of the corresponding impulse response operating section.

Differences corresponding not only to the received wave at time j but also to the received waves at time $j-1$ and $j-2$ are obtained, impulse responses are corrected by the correcting sections based upon all obtained differences, and each corrected impulse response is supplied to the impulse response operating sections of the next stage, then the processing similar to the processing above-mentioned is repetitively performed. Therefore, ultrasonic location with high accuracy can be performed, because influence by noises is greatly reduced even when noises are mixed instantaneously to the received wave.

In the second embodiment, impulse responses are estimated by taking the received waves at time j, j−1 and j−2 into consideration, but it is possible that the resistance to noises can further be raised by increasing the timings of the received waves which are to be taken into consideration.

The present invention is not limited to the above-mentioned embodiments.

The present invention is applicable to various fields such as an ultrasonic diagnosis apparatus, sonar, radar and the like.

The present invention can be applied various modifications within an extent in which the scope of the present invention is not changed.

As is apparent from the foregoing, the location apparatus according to the present invention can achieve high spacial discrimination without using a special wave radiating device and wave receiving device. The location apparatus can enlarge a locating extent and can raise spacial discrimination by lowering a pulse frequency of a radiating wave and by raising a sampling rate of a received wave. The location apparatus can obtain impulse responses in real time which is different from the FFT processing. The location apparatus is preferable to an ultrasonic location apparatus, ultrasonic diagnosis apparatus, sonar, radar and the like.

What is claimed:

1. A location apparatus for measuring a location of a boundary face by radiating a radiating wave at the boundary face and by receiving a received wave reflected from the boundary face, the location apparatus comprising:

pulse train recording means for recording a radiating wave as plural pulses in a pulse train, a plurality of impulse response operating means for performing operations based upon a corresponding impulse response, each of the impulse response operating means being associated with one of the plural pulses, first convolution operating means for performing convolution operations upon operation results obtained by each of the impulse response operating means, first difference calculating means for calculating a difference between a convolution operation result from the first convolution operation means and a current received wave, and correcting means associated with each impulse response operating means for correcting the impulse response in the associated impulse response operating means based upon the difference calculated by the difference calculating means, the corrected impulse response for at least one of the plurality of impulse response operating means being provided to another of the plurality of the impulse response operating means.

2. A location apparatus as set forth in claim 1, further including;

preceding received wave outputting means for outputting a preceding received wave which precedes a current received wave, second convolution operating means for convolution operating operation results which correspond to the preceding received wave, second difference calculating means, for calculating a difference between a convolution operation result from the second convolution operation means and third convolution operating means for convolution operating a difference obtained one or both of the first and second difference calculating means, and for supplying a convolution operation result to the correcting means corresponding to each impulse response operating means.

* * * * *